UNITED STATES PATENT OFFICE.

THOMAS J. MAYALL, OF READING, MASSACHUSETTS.

ART OF ATTACHING RUBBER TO METAL.

SPECIFICATION forming part of Letters Patent No. 247,841, dated October 4, 1881.

Application filed June 22, 1881. (No specimens.)

*To all whom it may concern:*

Be it known that I, THOMAS J. MAYALL, of Reading, in the county of Middlesex and Commonwealth of Massachusetts, have invented a new and useful Improvement in the Art of Attaching Rubber to Metal, of which the following is a specification.

My invention relates to all manufactures wherein it is necessary or desirable to make rubber adhere firmly to metal, so that it cannot, under any circumstances, become loose, as in the manufacture of rolls for wringing-machines and other similar manufactures; and it consists in the application of one or more coatings of a compound solution of rubber and sulphide of antimony to the surface of the metal to which the rubber is to be affixed.

To practice my invention I mix and thoroughly blend together in a plastic mass pure rubber and the sulphide of antimony, by grinding or any suitable means, in the proportion of one pound of rubber to about two or three pounds of the sulphide of antimony. I then add enough of naphtha or other suitable solvent of rubber to reduce the mass to a semifluid condition, of the consistency of paint. This I apply to the surface of the metal to which the rubber is to be attached with a brush. The surface of the metal must be free from oil or grease, and may be slightly abraded with sand or emery paper before the compound is applied. When the first coat of the compound solution has dried a second coat may be applied. Then the body of rubber to be affixed to the metal may be added in layers or in mass, as is most convenient, and the whole submitted to the action of heat in any of the ordinary or known methods of vulcanizing, until it is cured to the degree of hardness required.

To make what is known as "hard rubber" I heat from three to six hours, according to the thickness of the body of rubber, at a temperature of about 300° Fahrenheit. To make rolls for wringing-machines and other articles of similar consistency I heat from one to four or even five hours in a temperature of about 235° to 285°.

The union of the rubber with the metal by this method is as complete and perfect as the union of two pieces of metal welded together, and the rubber can only be separated from the metal by cutting it away.

I claim as new and my invention—

The above-described improvement in the art of affixing rubber to metal, consisting of giving the metal one or more coatings of a compound solution of rubber and sulphide of antimony, and then applying the rubber and vulcanizing it, substantially as described.

THOS. J. MAYALL.

Witnesses:
CHS. HOUGHTON,
H. KENNEY, Jr.